United States Patent
Anggawijaya

(10) Patent No.: US 9,768,970 B2
(45) Date of Patent: Sep. 19, 2017

(54) ROBUST INTERNET GROUP MANAGEMENT PROTOCOL (IGMP) AND MULTICAST LISTENER DISCOVERY (MLD)

(71) Applicants: Allied Telesis Holdings Kabushiki Kaisha, Tokyo (JP); Allied Telesis, Inc., San Jose, CA (US)

(72) Inventor: Hermin Anggawijaya, Christchurch (NZ)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 14/802,740

(22) Filed: Jul. 17, 2015

(65) Prior Publication Data

US 2016/0020915 A1    Jan. 21, 2016

Related U.S. Application Data

(60) Provisional application No. 62/027,226, filed on Jul. 21, 2014.

(51) Int. Cl.
*H04L 12/18* (2006.01)
*H04L 29/06* (2006.01)

(52) U.S. Cl.
CPC ...... *H04L 12/185* (2013.01); *H04L 29/06455* (2013.01)

(58) Field of Classification Search
None
See application file for complete search history.

(56) References Cited

U.S. PATENT DOCUMENTS

| | | | |
|---|---|---|---|
| 6,710,702 B1* | 3/2004 | Averbuch | H04L 29/06 340/7.1 |
| 2003/0145102 A1* | 7/2003 | Keller-Tuberg | H04L 12/185 709/237 |
| 2003/0236905 A1* | 12/2003 | Choi | H04L 29/06 709/231 |
| 2004/0162819 A1* | 8/2004 | Omae | H04L 47/10 |

* cited by examiner

*Primary Examiner* — Robert C Scheibel
(74) *Attorney, Agent, or Firm* — Brooks Acordia IP Law, P.C.; Michael Zarrabian

(57) ABSTRACT

A system may include a querier device and a multicast listener device. According to some embodiments, the querier device is configured to transmit a group membership general query to the multicast listener device. The multicast listener device may be configured to transmit a plurality of group membership report packets to the querier device until an acknowledgement of receipt of a group membership report packet of the plurality of group membership report packets is transmitted from the querier device to the multicast device. According to some embodiments the transmission of the plurality of membership report packets is responsive to the group membership general query, and the transmission of the plurality of group membership report packets occurs regardless of robustness variable value.

17 Claims, 7 Drawing Sheets

ROBUST INTERNET GROUP MANAGEMENT PROTOCOL (IGMP) AND MULTICAST LISTENER DISCOVERY (MLD)

RELATED APPLICATION

The present applications claims the benefit and priority to the provisional patent application No. 62/027,226 filed on Jul. 21, 2014 by the same Applicant, which is incorporated herein in its entirety by reference.

BACKGROUND

Increased connectivity between various electronic devices in recent years has lead to an increased need for receiving multicast data. In general, electronic devices may rely on Internet Group Management Protocol (IGMP) and/or Multicast Listener Discovery (MLD) for multicast data communication. A group membership report packet is needed to establish multicast data transmission. The group membership report packet may be transmitted according to "robustness variable" number, e.g., transmitted 2 times, 3 times, etc. However, in IGMP or MLD protocol, the group membership report packet may not be received (or dropped), e.g., a bridge or L2 switch may be in transient state and not forward the packet or it may be recovering from a reboot and may not forward state, in initializing state, recovering from a crash in the midst of a fail-over procedure in a live-live redundant system scenarios, etc. The system delays for a long time, e.g., 125 seconds, if the group membership report packet is transmitted a number of times according to the robustness variable but not received.

It is appreciated that the robustness variable number may be set, e.g., 2, in the protocol. Accordingly, the group membership report packet transmission is terminated after the set number of times the group membership report packets are transmitted and the system delays for a long time, e.g., 125 seconds, before another query is received, after which the system may transmit another robustness variable number of group membership report packets, if any.

Unfortunately, standards such as RFC3376 Sec 4.1.6 for IGMP and RFC3810 Sec 5.1.8 for MLD specifications are limited by allowing only a maximum value for the robustness variable, e.g., 7. Furthermore, increasing the number of robustness variable while might alleviate the packet loss issue, it unnecessarily increase chattiness of protocols under normal conditions.

SUMMARY

Accordingly, a need has arisen to improve the resiliency of IGMP and/or MLD protocols. Resiliency may be improved, in some embodiments, by ignoring the robustness variable number and maintaining transmission of a group membership report packet until an acknowledgement message is received from the querier device. In some embodiments, IGMP and/or MLD sends membership report packets from the multicast listener device to the querier device, in the absence of receipt of an acknowledgement message from the querier. As a result, IGMP and/or MLD becomes more resilient because the system does not delay for an unnecessary long time, e.g., 125 seconds, and the group membership report packet is received by the querier device as soon as the transient state, reboot event, initializing state, or recovering event is complete. In some embodiments, the IGMP and/or MLD may ignore the robustness variable and keep sending membership packets until an acknowledgement packet from IGMP/MLD querier is received.

A system may include a querier device and a multicast listener device. According to some embodiments, the querier device is configured to transmit a group membership general query to the multicast listener device. The multicast listener device may be configured to transmit a plurality of group membership report packets to the querier device until an acknowledgement of receipt of a group membership report packet of the plurality of group membership report packets is transmitted from the querier device to the multicast device. According to some embodiments the transmission of the plurality of membership report packets is responsive to the group membership general query, and the transmission of the plurality of group membership report packets occurs regardless of robustness variable value.

The querier device as described above may transmit multicast data to the multicast listener device subsequent to transmission of the acknowledgement of receipt of the group membership report packet of the plurality of group membership report packets. According to some embodiments, the group membership general query includes a flag that when asserted causes the multicast listener device to ignore the robustness variable value and further to continue transmitting the plurality of group membership report packets until the acknowledgement of receipt of the group membership report packet is received. It is appreciated that in some embodiments a group membership report packet of the plurality of group membership report packets may include a flag that when asserted indicates that the acknowledgement of receipt of the group membership report packet of the plurality of group membership report packets is requested.

The querier device may be in transient state during a portion of time which the plurality of group membership report packets are being transmitted by the multicast listener device. It is appreciated that in some embodiments, the group membership report packets may not be received by the querier device due to transmission failure or failure of intermediary devices, e.g., L2 switches, bridges, etc. It is appreciated that a number of group membership report packets of the plurality of group membership report packets may be greater than the robustness variable value. Moreover, the group membership report packet of the plurality of group membership packets may be transmitted by the multicast listener device and received by the querier device in absence of transmission of another group membership general query.

These and various other features and advantages will be apparent from a reading of the following detailed description.

BRIEF DESCRIPTION OF DRAWINGS

The present embodiments are illustrated by way of example, and not by way of limitation, in the figures of the accompanying drawings and in which like reference numerals refer to similar elements.

DETAILED DESCRIPTION

Figure 1A:
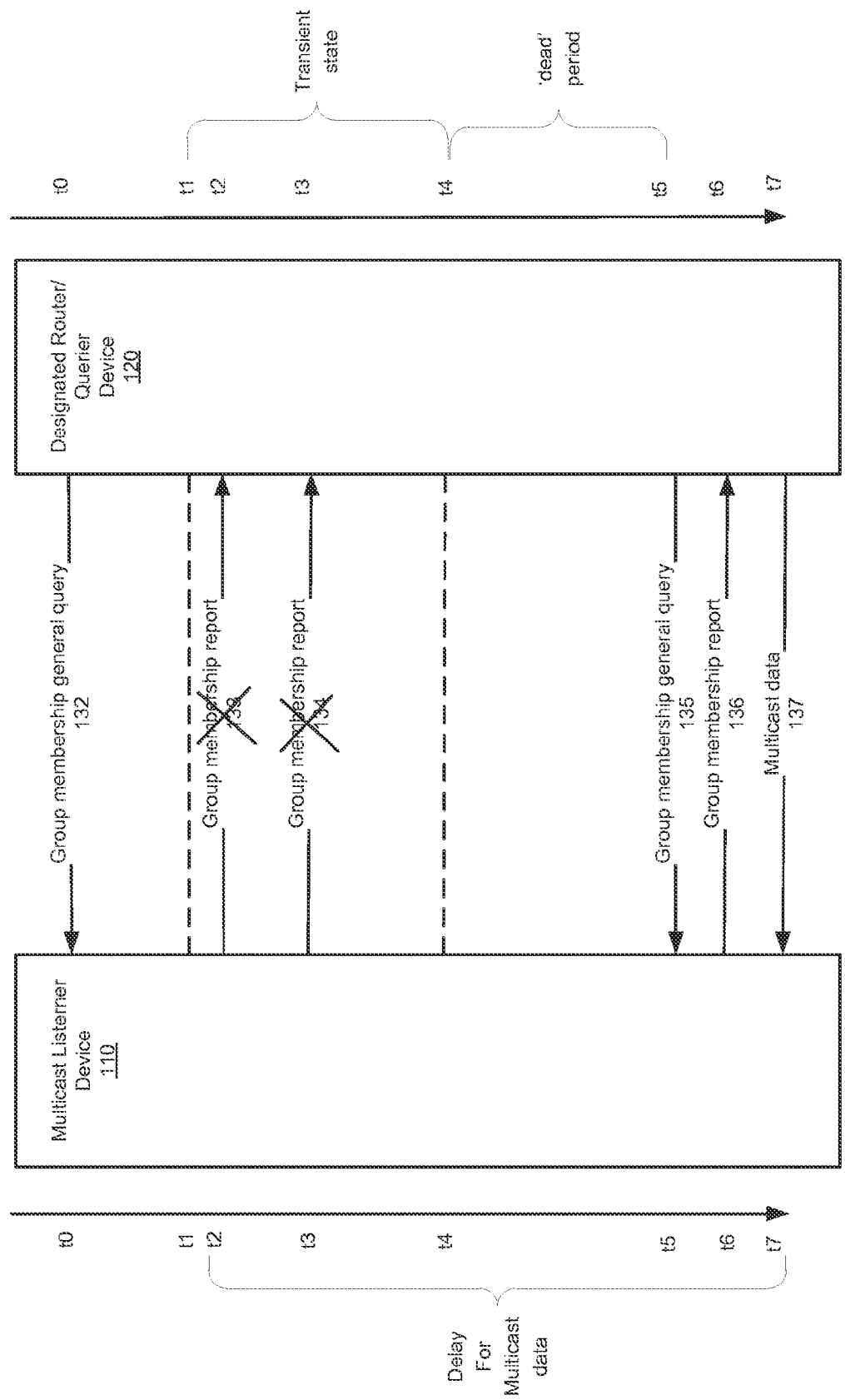
FIG. 1A shows an IGMP/MLD operation with transient state on a designated device suffering from a long delay period in receiving multicast data.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "determining," "sending," "receiving," "transmitting," "communicating," "providing," "accessing," "associating," "disabling," "enabling," "configuring," "initiating," "starting," "terminating," "ending," "configuring," "forming," "updating," "asserting," "clearing," "entering" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

In general, electronic devices may rely on Internet Group Management Protocol (IGMP) and/or Multicast Listener Discovery (MLD) for multicast data communication. A group membership report packet is transmitted to establish multicast data transmission. IGMP and/or MLD protocols allow multicast listener devices to send up to "Robustness Variable" number of group membership report packets, e.g., transmitted 2 times, 3 times, etc., to a designated router/querier device (hereinafter querier device) to request receiving multicast data corresponding to the multicast group devices listed in the group membership report packet(s). It is appreciated that throughout this application references to querier device may include any intermediary devices such as bridges, L2 switches, etc. However, in IGMP or MLD protocol, the group membership report packet may not be received (or dropped) by the querier device because the querier device and/or any intermediary device such as bridges, L2 switches, etc., may be in transient state and not forward the packet or it may be recovering from a reboot and may not forward state, it may be in initializing state, it may be recovering from a crash in the midst of a fail-over procedure in a live-live redundant system scenarios, etc. It is appreciated that in some embodiments, the group membership report packets may not be received by the querier device due to transmission failure or failure of intermediary devices, e.g., L2 switches, bridges, etc. The system delays for a long time, e.g., 125 seconds, if the group membership report packet is transmitted a number of times according to the robustness variable but not received by the querier device.

It is appreciated that the robustness variable number may be set, e.g., 2, in the protocol. Accordingly, the group membership report packet transmission is terminated after the set number of times the group membership report packet is transmitted and the system delays for a long time, e.g., 125 seconds, before another group membership general query is sent from the querier device in order to receive the group membership report packet, if any.

Accordingly, a need has arisen to improve the resiliency of IGMP and/or MLD protocols. Resiliency may be improved, in some embodiments, by ignoring the robustness variable number and maintaining transmission of the group membership report packet until an acknowledgement message is received from the querier device.

The multicast listener device according to some embodiments ignores the robustness variable in response to an indication, e.g., a flag being set. Accordingly, the multicast listener device continues with transmission of the group membership report packet to the querier device according to some time intervals regardless of the robustness variable until an acknowledgement signal from the querier device is received. As such, unnecessary delay, e.g., 125 seconds, before the querier device transmits another group membership general query to the multicast listener device and for the multicast listener device to transmit another group membership report packet to the querier device is eliminated. Furthermore, unnecessary chatty events under normal operating conditions can be avoided because the group membership report packet is transmitted up to the robustness variable times if the indication, e.g., a flag, is cleared instead of continuous transmission. As a result, IGMP and/or MLD becomes more resilient. In some embodiments, the IGMP and/or MLD may ignore the robustness variable and keep sending group membership report packets until either the next group membership general query is received, or acknowledgement packet from the querier is received.

Referring now to FIG. 1A, operation with transient state on a designated device suffering from a long delay period in receiving multicast data is shown. A multicast listener device 110 is coupled to a designate device/querier device 120, e.g., a router, etc., (hereinafter querier device). The RFC3376 version 3 describes the IGMP version 3, used by computer systems running IPv4 as multicast listener devices, e.g., multicast listener device 110, to report multicast group device memberships to directly adjacent multicast devices (not shown), e.g., routers, etc., one of which is elected as the designated device/querier 120, e.g., router, whose task is to forward multicast data to the local area network where membership of the multicast devices group has been reported by multicast listener devices.

RFC3810—MLD version 2 (MLDv2) for IPv6 is a mechanism similar to IGMP version 3. While IGMP for RFC3376 is employed by systems running IPv4, MLD for RFC3810 is utilized by systems running IPv6, to report multicast group memberships to directly adjacent IPv6 multicast devices, e.g., routers. The mechanism employed by MLD for RFC3810 is similar in principle to the mechanism employed by IGMP for RFC3376. RFC4604—Using IGMP Version 3 (IGMPv3) and MLD protocol Version 2 (MLDv2) for source-specific multicast describes refinements and more detailed requirements for both IGMP and MLD to handle the source specific multicast transmission. Source specific multicast is delivery of multicast data/streams where multicast listener devices send multicast group membership reports for specific multicast data source. The RFC4604 also details the requirements for both multicast listeners and devices, e.g., routers, on handling various IGMP or MLD messages from older version implementation.

FIG. 1A illustrates that the multicast listener device 110 could suffer a longer period of delay in receiving multicast data than necessary when the querier device 120 experiences a temporary transient state. At time t0 the querier device 120 may transmit a group membership general query 132 packet to multicast listener device 110 and other multicast listener devices (not shown) in order to confirm that the multicast listener devices are still interested in receiving multicast data. Multicast listener devices still interested in receiving multicast data, e.g., multicast listener device 110, are required to notify the querier device 120 by sending a group membership report packet. It is appreciated that the group membership general queries may be transmitted in a defined time interval, e.g., every 125 seconds.

The group membership report packet 133 transmitted at time t2 by the multicast listener device 110 to the querier device 120 may not be received (or dropped) by querier device 120 because the querier device 120 may be in transient state that started at time t1. In some examples, the group membership report packet 133 transmitted may be dropped because the querier device 120 may be recovering from a reboot or it may be in initializing state or it may be recovering from a crash in the midst of a fail over procedure in a live-live redundant scenario, or a CPU may be too busy to process packets, or the communication link bandwidth may be saturated, etc. In normal operation, IGMP and MLD may need the multicast listener device 110 to transmit a robustness variable number, e.g., twice, of group membership report packets in order to protect the mechanism from the possibility of packet loss experienced by the local networks affecting the multicast group membership reports. A time may be associated with the robustness variable. For example, it may take 4 seconds to transmit the group membership report packets twice, which is the robustness variable value.

In this illustration, the robustness variable is 2 and as a result the multicast listener device 110 transmits the group membership report packets 133 and 134 at times t2 and t3. However, the querier device 120 does not receive either of the group membership report packets 133 or 134 since the querier device 120 is in a transient state and since the number of robustness variable is reached, the multicast listener device 110 stops transmitting the group membership report packets. Moreover, the querier device 120 deletes the membership record for the multicast listener device 110 because a group membership report packet is not received within a threshold time period. Thus, no multicast data is transmitted to the multicast listener device 110 despite its desire to receive multicast data.

Accordingly, the multicast listener device 110 unnecessarily waits for a long time (labeled as 'dead period') before the querier device 120 sends another group membership general query 135 at time t5 to multicast listener devices including the multicast listener device 110 even though the transient state of the querier device 120 has been over for a long time, at time t4. The multicast listener device 110 may transmit the group membership report 136 packet after it receives the group membership general query 135 at time t6. As such, the querier device 120 receives the group membership report 136 packet at time t6 and adds the multicast listener device 110 to the group of multicast listener devices and starts/resumes transmitting multicast data 137 at time t7.

Accordingly, a longer delay may be introduced for the multicast listener device 110 to receive multicast data from the querier device 120.

Figure 1B:
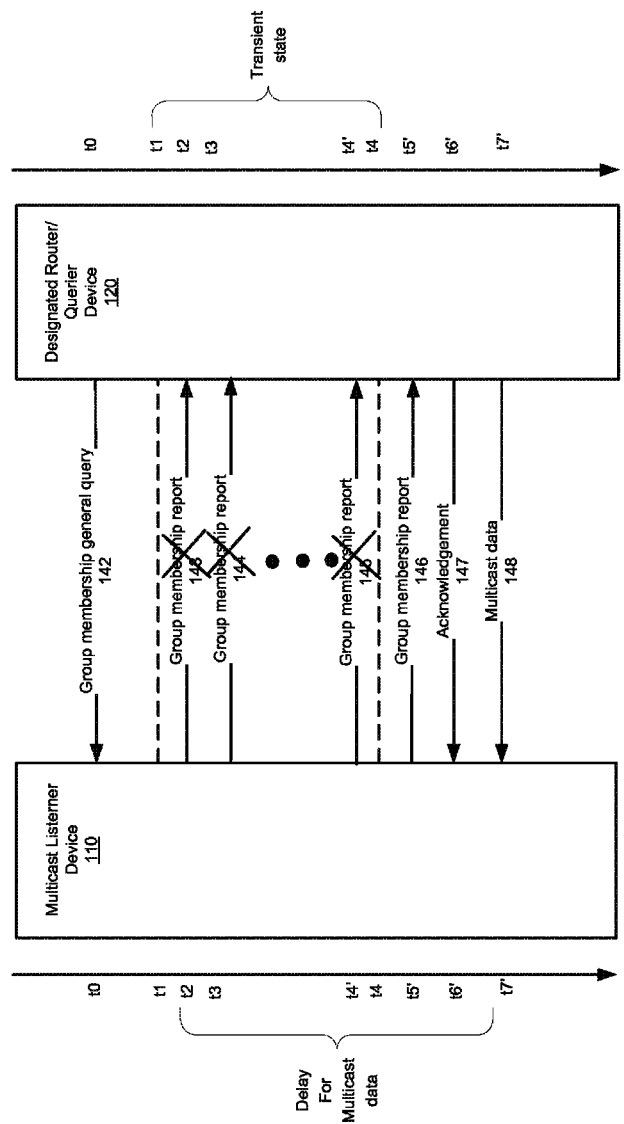
FIG. 1B shows an IGMP/MLD operation with transient state according to some embodiments.

Referring now to FIG. 1B, IGMP/MLD operation with transient state according to some embodiments is shown. At time t0, the querier device 120 transmits a group membership general query 142 to multicast listener devices (not shown) including the multicast listener device 110 in order to confirm that the multicast listener devices are still interested in receiving multicast data.

Multicast listener devices still interested in receiving multicast data, e.g., multicast listener device 110, are required to notify the querier device 120 by sending a group membership report packet. It is appreciated that the group membership general queries may be transmitted in a defined time interval, e.g., every 125 seconds.

The group membership report packet 143 transmitted at time t2 by the multicast listener device 110 to the querier device 120 may not be received (or dropped) by querier device 120 because the querier device 120 may be in transient state, that started at time t1, for recovering from a reboot or it may be in initializing state or it may be recovering from a crash in the midst of a fail over procedure in a live-live redundant scenario, a CPU being too busy to process packets, saturation of communication link bandwidth, etc. In normal operation, IGMP and MLD may need the multicast listener device 110 to transmit a robustness variable number, e.g., twice, of group membership report packets in order to protect the mechanism from the possibility of packet loss experienced by the local networks affecting the multicast group membership reports.

In some embodiments, the multicast listener device 110 may be configured to ignore the robustness variable number and further configured to continue transmission of membership report packets until the multicast listener device receives an acknowledgement signal from the querier device 120 that the group membership report packet has been received. According to some embodiments the group membership report transmitted by the multicast listener device 110 may include an indication, e.g., a flag, to indicate that an acknowledgement is requested from the querier device 120 to indicate that the group membership report packet is received. For example, the multicast listener device 110, if configured, may ignore the robustness variable number and it may continue with transmission of the group membership report packets until an acknowledgement from the querier device 120 is received. For example, in this illustration, the robustness variable is 2 but it is ignored by the multicast listener device 110 and the group membership report packets 142, 143 and 145 are continuously transmitted at times t2, t3 and t4' because no acknowledgement has been received from the querier device 120.

The querier device 120 does not receive any of the group membership report packets 143-145 since the querier device 120 is in a transient state. It is appreciated that in some embodiments, the group membership report packets may not be received by the querier device due to transmission failure or failure of intermediary devices, e.g., L2 switches, bridges, etc. However, the multicast listener device 110 keeps transmitting group membership report packets because the robustness variable is ignored and no acknowledgment is received from the querier device 120.

At time t5', group membership report 146 transmitted by the multicast listener device 110 is received by the querier device 120 since the transient state ends at time t4. According to some embodiments, the querier device 120 determines whether an acknowledgement signal should be transmitted. For example, if the acknowledgement request flag is asserted, then the querier device 120 sends an acknowledgement packet with source IP address equal to the IP address of the interface receiving the membership report packet, and the IP destination address is set to the source IP address of the group membership report packet.

According to some embodiments, the querier device 120 may transmit an acknowledgement 147 signal to the multicast listener device 110 to indicate that the group membership report packet has been received. The acknowledgement signal may include a flag asserted to indicate that the group membership report packet has been received. At time t6', the multicast listener device 110 receives the acknowledgement signal 147 and as a result it terminates sending any further group membership report packets. The multicast listener device 110 may confirm that the acknowledgement signal is valid if the destination IP address or IPv6, is the same as IP address or IPv6 address of the interface receiving the acknowledgement signal, and if the flag for acknowledgement of receipt of group membership report is asserted. At time t7', the querier device 120 starts/resumes transmitting multicast data 148 to the multicast listener device 110. It is appreciated that t7'<t7, thus shortening the wait period before multicast data is transmitted from the querier device 120 to the multicast listener device 110.

Accordingly, the multicast listener device 110, unlike that of FIG. 1A, does not wait for a long time (labeled as 'dead period' in FIG. 1A) before the querier device 120 having to send multicast data because the multicast listener device 110 continues with transmission of the group membership report packets until an acknowledgement of receipt is received from the querier device 120. Thus, a group membership report packet is transmitted from the multicast listener device 110 to the querier device 120 shortly after the transient state of the querier device 120 is over rather than having to wait a long period, e.g., 125 second, as shown in FIG. 1A.

Accordingly, if during transmission of the group membership reports by the multicast listener device 110, the querier device 120 suffers a temporary transient state, as soon as the querier device 120 receives the next group membership report packet after it gets itself out of the transient state, the querier device 120 can start transmitting the multicast data, avoiding the delay labeled as the 'dead period' depicted in FIG. 1A. In other words, the multicast listener devices send the group membership report packets continuously or at a predetermined interval, regardless of the robustness variable, until the multicast group membership report acknowledgement is received by the multicast listener device 110 when the querier device 120 eventually recovers from the transient state. As such, the delay in multicast data transmission is reduced. As presented above, in some embodiments, the group membership report packets may not be received by the querier device due to transmission failure or failure of intermediary devices such as L2 switches, bridges, etc.

It is appreciated that the new protocol formats are backward compatible with existing protocol standards. For example, the new IGMP and/or MLD query packet format may include a flag or indication whether or not the querier device is capable of sending multicast group membership report acknowledgement. Thus, the multicast listener device may use this flag or indication to determine whether it should employ the new protocol or the old protocol.

It is appreciated that the embodiments are described with respect to the querier device being in transient state. However, it is appreciated that the embodiments described for illustrative purposes and should not be construed as limiting the scopes. For example, a similar approach may be used when the querier device is not in a transient state but rather does not receive the group membership report packets due to transmission failure or failure of intermediary devices such as L2 switches, bridges, etc.

Figure 2:
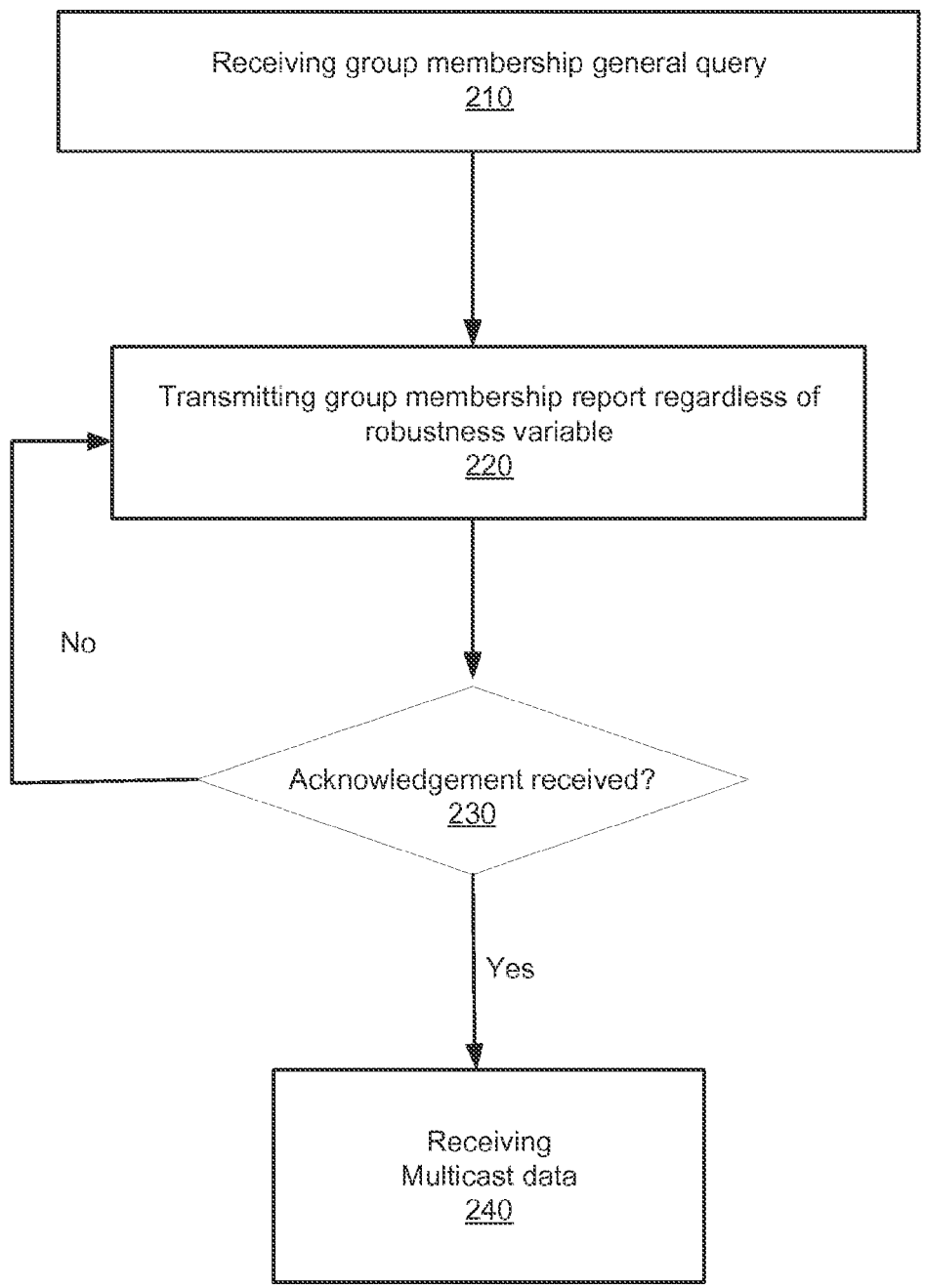
FIG. 2 shows an exemplary flow diagram in accordance with some embodiments.

Referring now to FIG. 2, an exemplary flow diagram in accordance with some embodiments is shown. At step 210, a group membership general query is transmitted by the querier device 120 and received by the multicast listener device 110. At step 220, group membership report packet is transmitted by the multicast listener device 110 to the querier device 120. It is appreciated that the group membership report packet may include a flag that if asserted indicates that the multicast listener device 110 expects an acknowledgement of receipt of the group membership report packet from the querier device 120. At step 230, it is determined whether an acknowledgement indication, e.g., signal, flag, etc., is received at the multicast listener device 110 from the querier device 120. If the acknowledgement signal is not received, the process goes to step 220 and another group membership report packet is transmitted. For example, the acknowledgement signal may not be sent because the querier device 120 may be in a transient state. Steps 220 and 230 repeat until an acknowledgment signal is received regardless of the robustness variable. At step 240, once the acknowledgement is received, the multicast listener device 110 terminates transmission of any other group membership report packets and the querier device 120 starts/resumes transmitting multicast.

It is appreciated that the embodiments are described with respect to the querier device being in transient state. However, it is appreciated that the embodiments described for illustrative purposes and should not be construed as limiting the scopes. For example, a similar approach may be used when the querier device is not in a transient state but rather does not receive the group membership report packets due to transmission failure or failure of intermediary devices such as L2 switches, bridges, etc.

Figure 3:
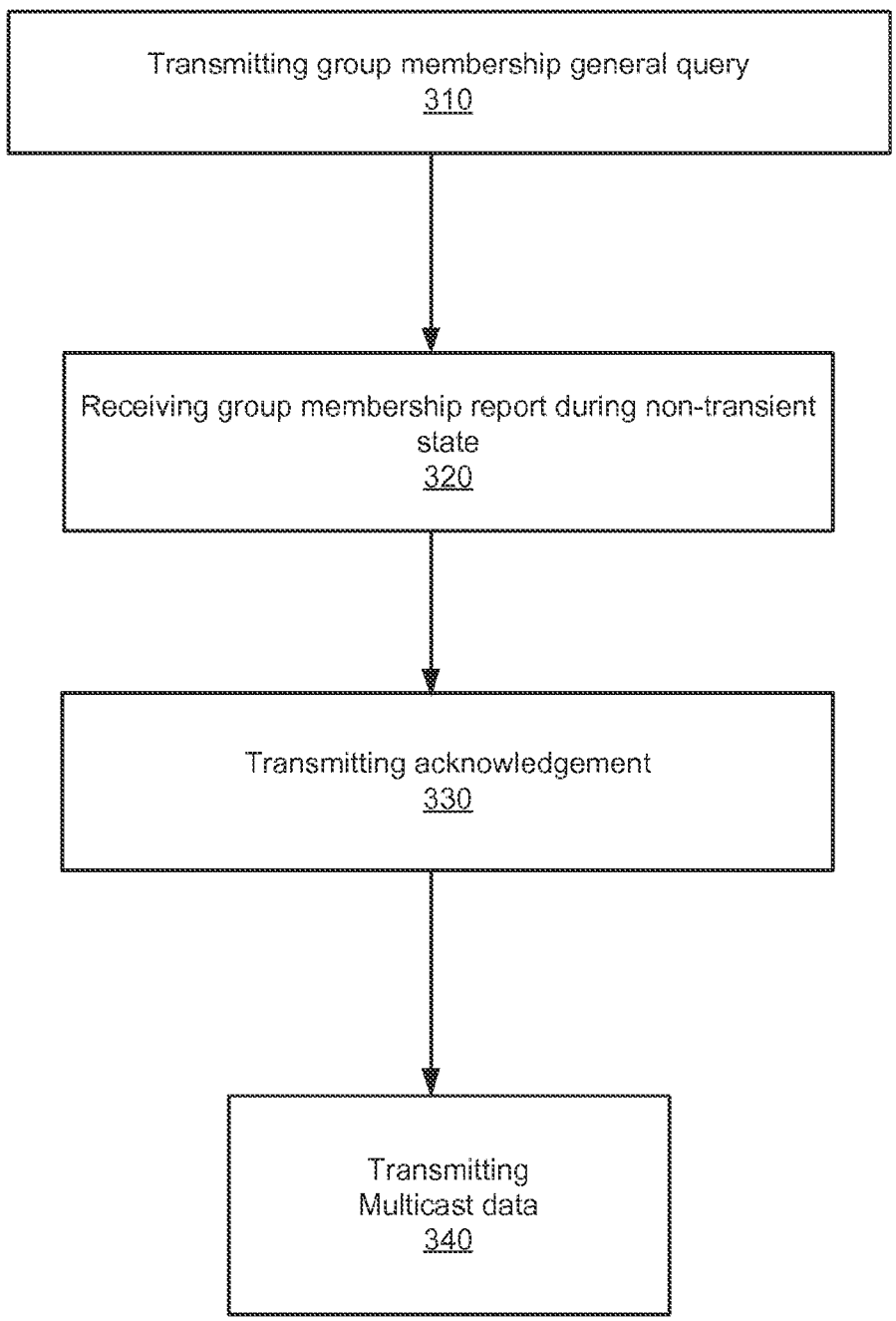
FIG. 3 shows another exemplary flow diagram in accordance with some embodiments.

Referring now to FIG. 3, another exemplary flow diagram in accordance with some embodiments is shown. At step 310, a group membership general query is transmitted from the querier device 120 to the multicast listener device 110. It is appreciated that the querier device 120 may go into a transient state and not receive a group membership report packet until it is recovered from the transient state. At step 320, the querier device 120 may receive the group membership report packet during its non-transient state from the multicast listener device 110. It is appreciated that the group membership report packet may include an indication such as a flag that when asserted indicates that the multicast listener device 110 is waiting for an acknowledgement that the group membership report packet has been received by the querier device 120. At step 330, an acknowledgement signal may be transmitted from the querier device 120 to the multicast listener device 110 to indicate that the group membership report packet has been received. It is appreciated that the acknowledgement signal may include a flag that when asserted indicates that the group membership report packet has been received and it may further include the original flag that indicated that an acknowledgement signal is needed by the multicast listener device 110, which may now be cleared when transmitting the acknowledgement signal. At step 340, multicast data is transmitted from the querier device 120 to the multicast listener device 110.

It is appreciated that the embodiments are described with respect to the querier device being in transient state. However, it is appreciated that the embodiments described for illustrative purposes and should not be construed as limiting the scopes. For example, a similar approach may be used when the querier device is not in a transient state but rather does not receive the group membership report packets due to transmission failure or failure of intermediary devices such as L2 switches, bridges, etc.

Figure 4:
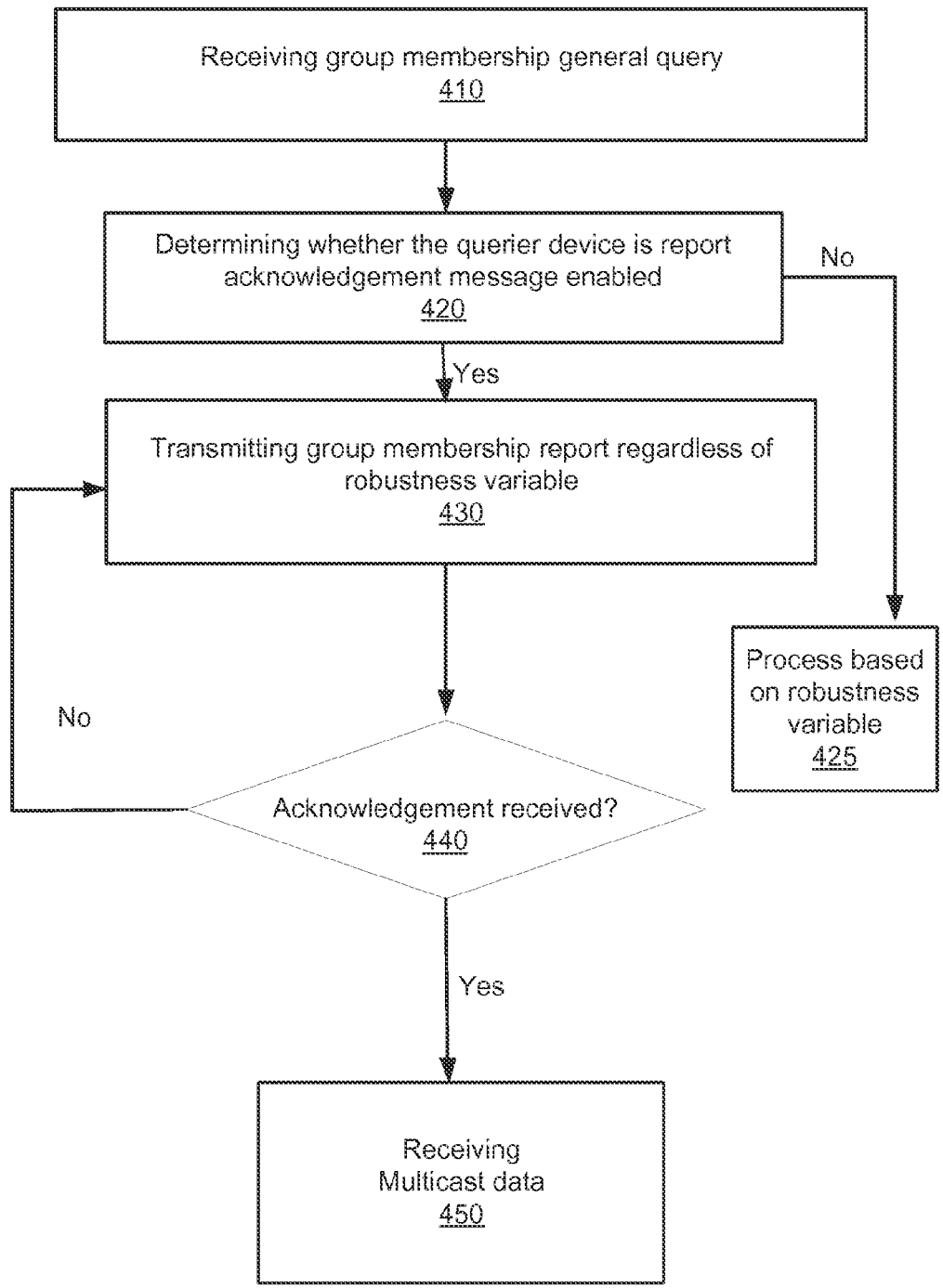
FIG. 4 shows yet another exemplary flow diagram in accordance with some embodiments.

Referring now to FIG. 4, yet another exemplary flow diagram in accordance with some embodiments is shown. At step 410, a group membership general query is transmitted by the querier device 120 and received by the multicast listener device 110. At step 420, it is determined whether the querier device 120 is report acknowledgement message enabled, e.g., if a flag is asserted. In other words, it is determined whether the querier device 120 should operate based on robustness variable or that the robustness variable should be ignored. If the querier device 120 is not report acknowledgement message enabled then at step 425 the system operates in accordance to the robustness variable. In other words, the group membership report packets are transmitted only until the robustness variable is reached and at that point any further transmission is terminated until another group membership general packet is transmitted from the querier device 120 to the multicast listener device 110.

If it is determined that the querier device 120 is report acknowledgement message enabled, then process goes to step 430. At step 430, a group membership report packet is transmitted by the multicast listener device 110 to the querier device 120. It is appreciated that the group membership report packet may include a flag that if asserted indicates that the multicast listener device 110 expects an acknowledgement of receipt of the group membership report packet from the querier device 120. At step 440, it is determined whether an acknowledgement indication, e.g., signal, flag, etc., is received at the multicast listener device 110 from the querier device 120. If the acknowledgement signal is not received, the process goes to step 430 and another group membership report packet is transmitted. For example, the acknowledgement signal may not be sent because the querier device 120 may be in a transient state. Steps 430 and 440 repeat until an acknowledgment signal is received regardless of the robustness variable. At step 450, once the acknowledgement is received, the multicast listener device 110 terminates transmission of any other group membership report packets and the querier device 120 starts/resumes transmitting multicast.

It is appreciated that the embodiments are described with respect to the querier device being in transient state. However, it is appreciated that the embodiments described for illustrative purposes and should not be construed as limiting the scopes. For example, a similar approach may be used when the querier device is not in a transient state but rather does not receive the group membership report packets due to transmission failure or failure of intermediary devices such as L2 switches, bridges, etc.

Figure 5:
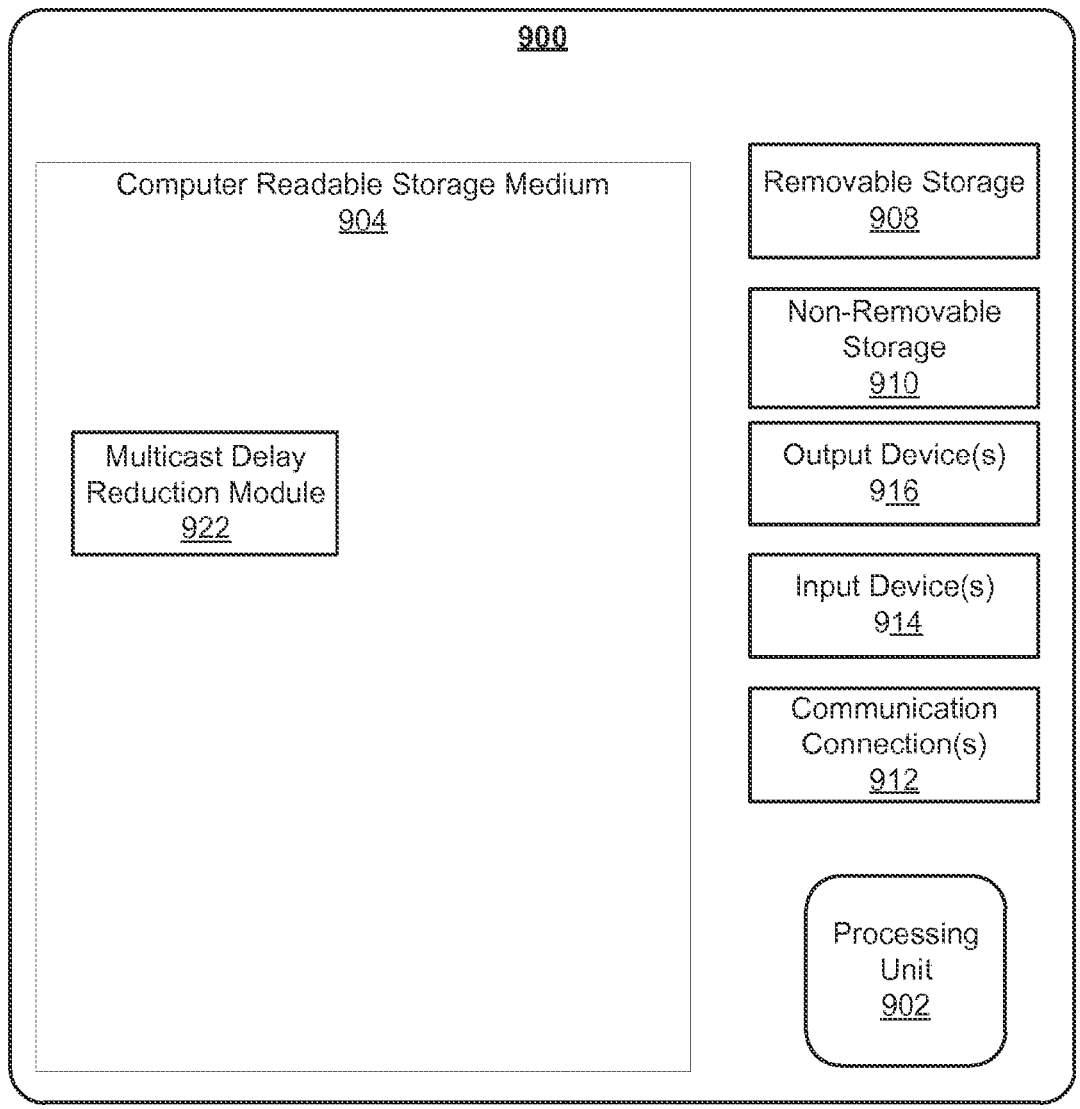
FIG. 5 shows an exemplary computer system in accordance with some embodiments.

FIG. 5 shows an exemplary computer system in accordance with some embodiments. With reference to FIG. 5, an exemplary system module for implementing embodiments includes a general purpose computing system environment, such as computing system environment 900. Computing system environment 900 may include, but is not limited to, servers, switches, routers, desktop computers, laptops, tablets, mobile devices, and smartphones. In its most basic configuration, computing system environment 900 typically includes at least one processing unit 902 and computer readable storage medium 904. Depending on the exact configuration and type of computing system environment, computer readable storage medium 904 may be volatile (such as RAM), non-volatile (such as ROM, flash memory, etc.) or some combination of the two. Portions of computer readable storage medium 904 when executed improve robustness of IGMP and/or MLD by reducing the delay in transmission of multicast data (e.g., processes 300, 400, and 500).

Additionally, in various embodiments, computing system environment 900 may also have other features/functionality. For example, computing system environment 900 may also include additional storage (removable and/or non-removable) including, but not limited to, magnetic or optical disks or tape. Such additional storage is illustrated by removable storage 908 and non-removable storage 910. Computer storage media includes volatile and nonvolatile, removable and non-removable media implemented in any method or technology for storage of information such as computer readable instructions, data structures, program modules or other data. Computer readable medium 904, removable storage 908 and nonremovable storage 910 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

In some embodiments, computing system environment 900 may also contain communications connection(s) 912 that allow it to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 912 may allow computing system environment 900 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 912 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 900 may also have input device(s) 914 such as keyboard, mouse, a terminal or terminal emulator (either connected or remotely accessible via telnet, SSH, http, SSL, etc.), pen, voice input device, touch input device, remote control, etc. Output device(s) 916 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, computer readable storage medium 904 includes a multicast delay reduction module 922. The multicast delay reduction module 922 is configured to reduce delay in transmission of multicast data according to flow diagrams 200-400, for instance.

It is appreciated that implementations according to embodiments are described with respect to a computer system are merely exemplary and not intended to limit the scope of the present invention. For example, embodiments may be implemented on devices such as switches and routers, which may contain application specific integrated circuits (ASICs), field programmable gate arrays (FPGAs), etc. It is appreciated that these devices may include a computer readable medium for storing instructions for implementing methods according to flow diagrams 200-400.

Figure 6:
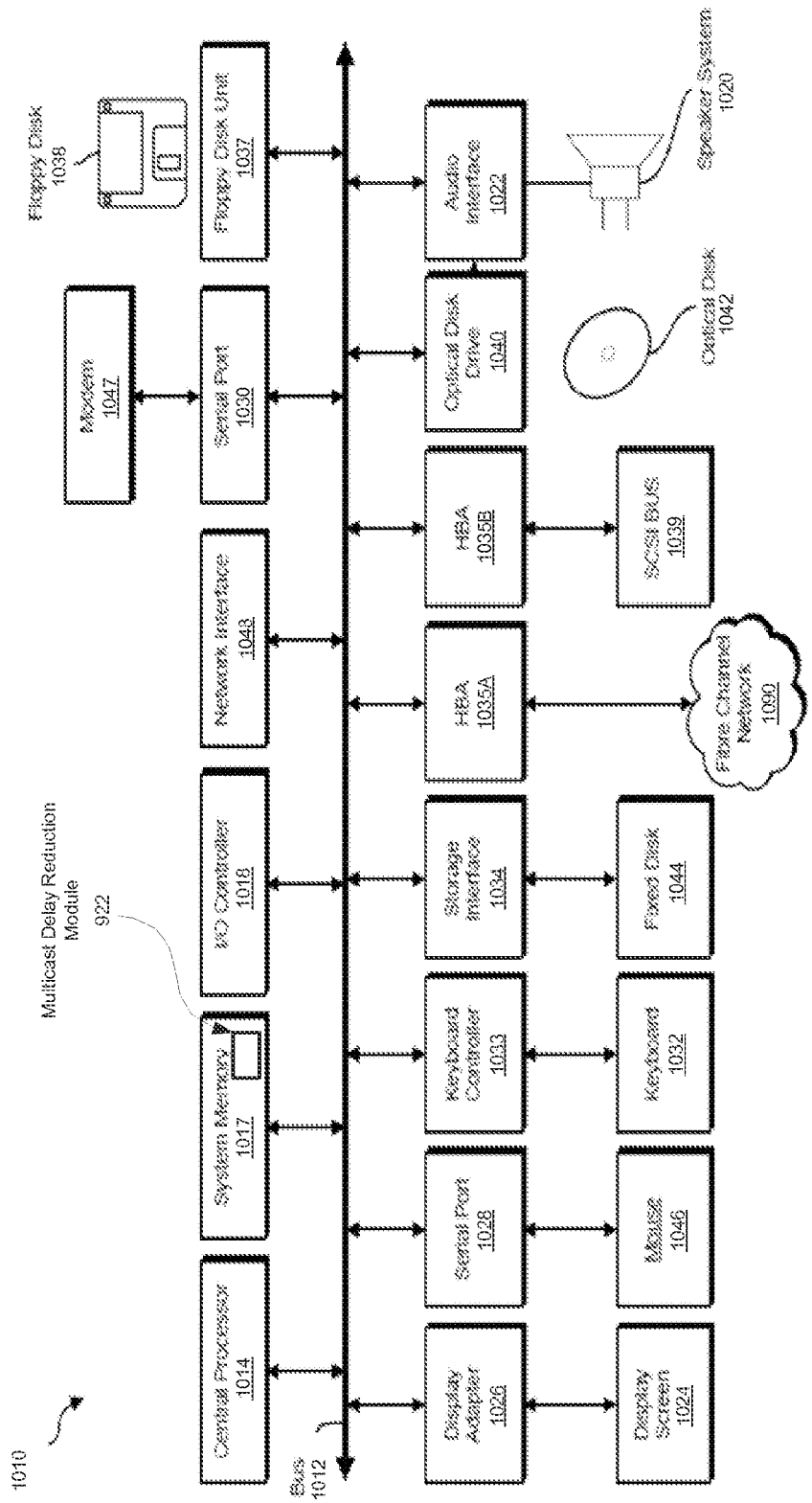
FIG. 6 shows a block diagram of another exemplary computer system in accordance with some embodiments.

Referring now to FIG. 6, a block diagram of another exemplary computer system in accordance with some embodiments is shown. FIG. 6 depicts a block diagram of a computer system 1010 suitable for implementing the present disclosure. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012). It is appreciated that the network interface 1048 may include one or more Ethernet ports, wireless local area network (WLAN) interfaces, etc., but are not limited thereto. System memory 1017 includes a multicast delay reduction module 922 configured to reduce delay in transmission of multicast data according to flow diagrams 200-400, for instance. It is appreciated that the multicast delay reduction module 922 may be located anywhere in the system and is not limited to the system memory 1017. As such, residing of multicast delay reduction module 922 within the system memory 1017 is merely exemplary and not intended to limit the scope of the present invention. For example, parts of the multicast delay reduction module 922 may reside within the central processor 1014 and/or the network interface 1048 but are not limited thereto.

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Network interface 1048 may provide multiple connections to other devices. Furthermore, modem 1047 may provide a direct connection to a remote server via a telephone link or to the Internet via an internet service provider (ISP). Network interface 1048 may provide one or more connection to a data network, which may include any number of networked devices. It is appreciated that the connections via the network interface 1048 may be via a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A system comprising:
    a querier device; and
    a multicast listener device,
    wherein the querier device is configured to transmit a group membership general query to the multicast listener device,
    wherein the multicast listener device is configured to transmit a plurality of group membership report packets to the querier device until an acknowledgement of receipt of a group membership report packet of the plurality of group membership report packets is transmitted from the querier device to the multicast device, wherein transmission of the plurality of membership report packets is responsive to the group membership general query, and wherein the transmission of the plurality of group membership report packets occurs regardless of a robustness variable value;
    wherein the group membership general query includes a flag that when asserted causes the multicast listener device to ignore the robustness variable value and further to continue transmitting the plurality of group membership report packets until the acknowledgement of receipt of the group membership report packet is received.

2. The system as described in claim 1, wherein the querier device transmits multicast data to the multicast listener device subsequent to transmission of the acknowledgement of receipt of the group membership report packet of the plurality of group membership report packets.

3. The system as described in claim 1, wherein a group membership report packet of the plurality of group membership report packets includes a flag that when asserted indicates that the acknowledgement of receipt of the group membership report packet of the plurality of group membership report packets is requested.

4. The system as described in claim 1, wherein the querier device is in a transient state during a portion of time which the plurality of group membership report packets are being transmitted by the multicast listener device.

5. The system as described in claim 4, wherein a number of group membership report packets of the plurality of group membership report packets is greater than the robustness variable value.

6. The system as described in claim 5, wherein the group membership report packet of the plurality of group membership packets is transmitted by the multicast listener device and received by the querier device in absence of transmission of another group membership general query.

7. A method comprising:
    receiving a group membership general query from a querier device; and
    transmitting a plurality of membership report packets to the querier device until an acknowledgement signal is received, wherein the acknowledgement signal indicates that a group membership report packet is received by the querier device, and wherein the transmitting of the plurality of membership report packets occurs regardless of a robustness variable value;
    wherein the group membership general query includes a flag that when asserted causes the robustness variable value to be ignored and for the plurality of membership report packets to be transmitted until the acknowledgment signal is received.

8. The method as described in claim 7 further comprising:
receiving the acknowledgement signal from the querier device.

9. The method as described in claim 8 further comprising:
subsequent to receiving the acknowledgement signal, receiving multicast data from the querier device.

10. The method as described in claim 7 further comprising:
asserting a flag in each group membership report packet of the plurality of group membership report packets to indicate to the querier device that the acknowledgement of receipt of the group membership report packet of the plurality of group membership report packets is requested.

11. The method as described in claim 7, wherein the querier device is in a transient state during a portion of time which the plurality of group membership report packets are being transmitted.

12. The method as described in claim 11, wherein a number of group membership report packets of the plurality of group membership report packets is greater than the robustness variable value, and wherein a group membership report packet of the plurality of group membership packets is transmitted to the querier device and received by the querier device in absence of receiving of another group membership general query from the querier device.

13. A method comprising:
transmitting a group membership general query to a multicast listener device;
receiving a group membership report packet from the multicast listener device, wherein the group membership report packet is received after a time associated with a robustness variable for sending a plurality of group membership report packets has expired, and wherein the group membership report packet is received in absence of transmitting another group membership general query; and
transmitting an acknowledgement signal to the multicast listener device to indicate receipt of the group membership report packet;
wherein the group membership general query includes a flag that is asserted to configure the multicast listener device to ignore the robustness variable.

14. The method as described in claim 13 further comprising:
subsequent to transmitting the acknowledgement signal, transmitting multicast data to the multicast listener device.

15. The method as described in claim 13 further comprising:
asserting a flag to indicate that the group membership report packet has been received; and
clearing a flag in the group membership report packet that was asserted by the multicast listener device to indicate that the acknowledgement signal is requested.

16. The method as described in claim 13 further comprising:
entering a transient state, wherein a subset of the plurality of membership report packets is transmitted by the multicast listener device during the transient state and not received by a querier device.

17. The method as described in claim 16, wherein the group membership report packet is received after exiting the transient state.

* * * * *